Patented Sept. 14, 1926.

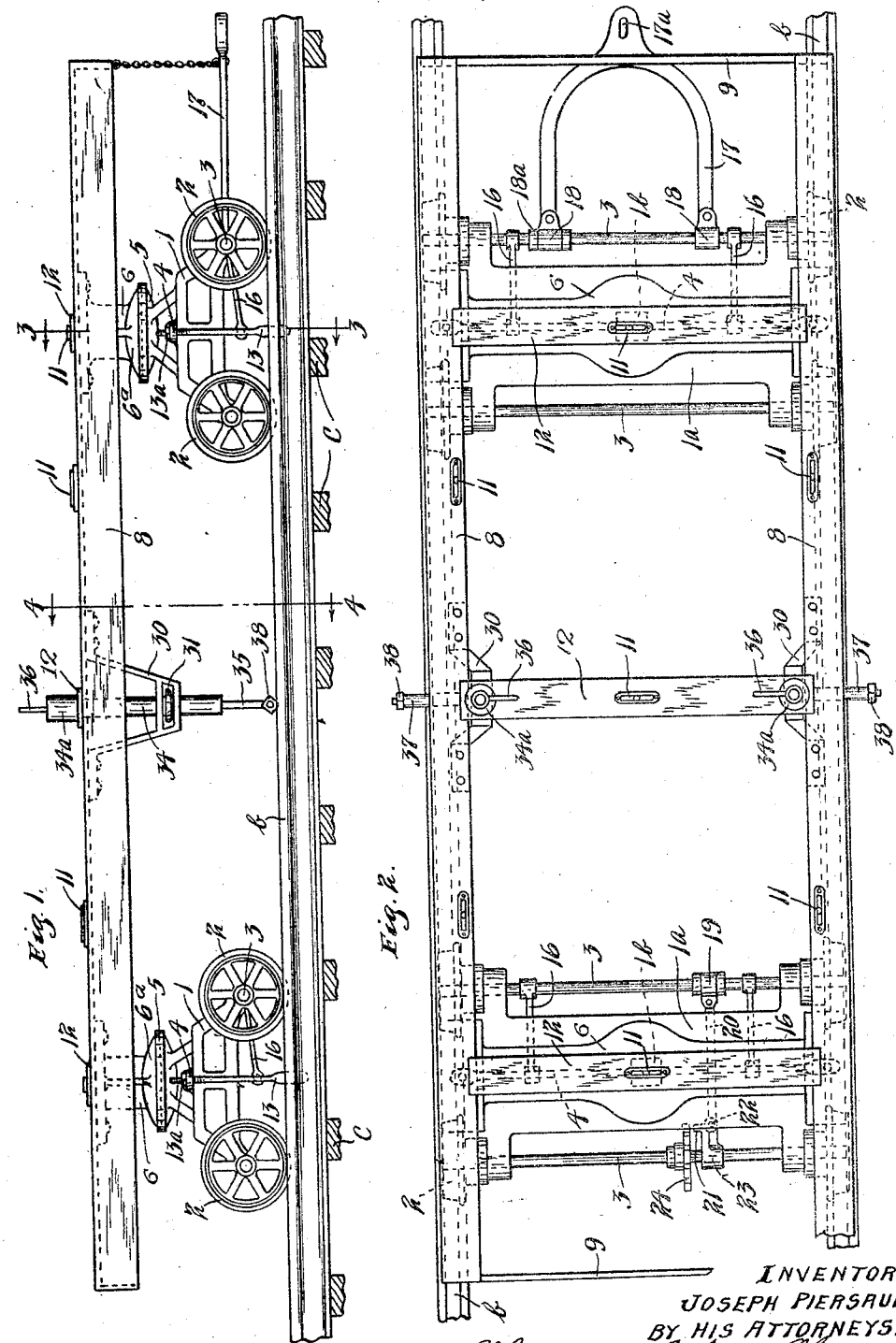

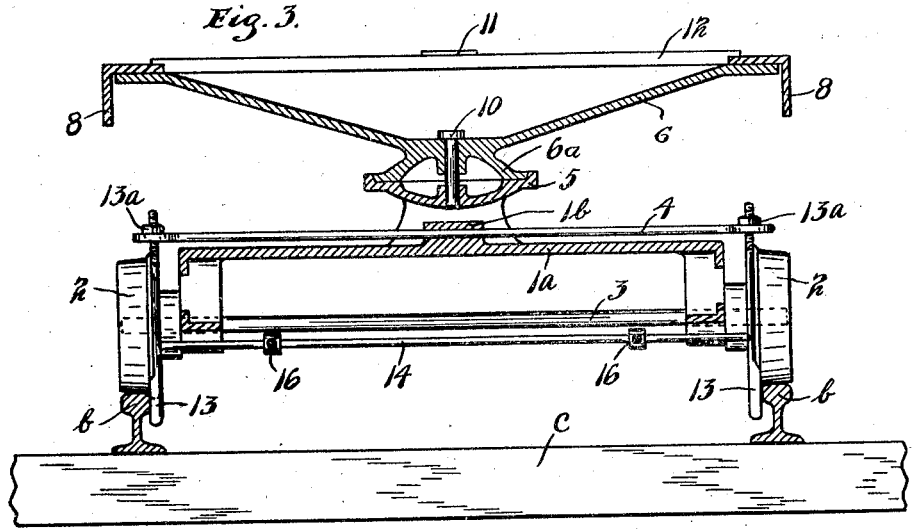

1,599,622

UNITED STATES PATENT OFFICE.

JOSEPH PIERSAUL, OF CHICAGO, ILLINOIS.

TRACK GAUGE AND LEVEL-INDICATING DEVICE.

Application filed May 11, 1925. Serial No. 29,371.

This invention relates to a gauging and level indicating device for tracks such as a railway track. Such tracks when constructed must have the rails thereof gauged accurately as to the distance between the same and it is also necessary to have the track level for conforming to the surveyed grade. It has been a common practice in laying track to have a bar gauge for locating the rails the correct distance apart, which gauge was provided with a level indicating device. Such a device only gauged and indicated the level of the track at one point and would have to be applied at short intervals.

It is an object of this invention to provide a gauge and level indicating device comprising a frame of considerable length, which frame is accurately mounted upon trucks spaced quite a distance apart whereby a long section of track can be gauged and the level thereof indicated without movement of the device.

It is a further object of the invention to have the said frame comprise spaced longitudinal side members provided with level indicating devices and also having transverse members provided with level indicating devices.

It is another object of the invention to provide such a frame having at its front end depending track gauging devices for properly spacing the rails.

It is still another object of the invention to also provide said frame at its rear end with a pair of rail gauging members.

It is also an object of the invention to provide a frame, as set forth above, with a pair of members depending from the central portion thereof for gauging the height of the rails.

Among other objects of the invention are the provision of draft means for the device and the provision of a locking mechanism for one of the trucks to hold the device stationary on a grade.

Other objects and advantages of the invention will be fully set forth in the following description made in connection with the accompanying drawings in which like reference characters refer to the same parts throughout the different views and in which, Fig. 1 is a view in side elevation of the device showing the same on a section of a track;

Fig. 2 is a plan view of the device, a small portion being omitted;

Fig. 3 is a central vertical section taken on the line 3—3 of Fig. 1;

Fig. 4 is a vertical section taken on the line 4—4 of Fig. 1;

Fig. 5 is a view on an enlarged scale of one of the level indicating devices.

Referring to the drawings, in Fig. 1 is shown a section of the track comprising rails $b$ mounted on cross ties $c$. The device of the invention comprises a pair of spaced trucks 1, each shown as having two pairs of wheels 2, said wheels being of the flange type and running on the rails $b$. The trucks 1 are provided with bearings for receiving the axles 3 of said trucks. Said trucks have bars $1^a$ extending between the bearings thereof and forming the bolster of the truck. A lug $1^b$ projects centrally at the top of the bars $1^a$ and said lug is provided with a passage or bore extending transversely of the truck parallel with the axis adapted to receive a rod 4 which is slidable therein. Said rod 4 is provided with a flat portion at each end, with vertical apertures extending therethrough and the track gauging devices or bars 13 have threaded upper ends extending through said apertures, said ends being provided with nuts $13^a$ carried on top of bar 4 so that the members 13 depend loosely from the bars 4. The lower ends of the bars 13 are widened and provided with convex outer sides adapted to engage the heads of the rails $b$. The bars 13 are rigidly connected somewhat adjacent their lower ends by a rod 14. This rod is connected by links 16 to one of the axles 3, said links having hubs at each end embracing said rods and axles respectively.

These cross members $1^a$ are formed at their central portions above rods 4 with circular bearing or balancing plates 5 of considerable diameter, which plates have a finished upper bearing surface with a surrounding flange at the outer edge thereof and are also provided with centrally located and apertured hubs. Mounted to bear upon the bearing or balancing plates 5 are the similar circular bearing or balancing plates 6ª formed with lower bearing finished surfaces and which form the central portions of cross members 6 which cross members are bolted at their outer end to longitudinal side members 8 of angular shape in cross section. These side members 8 are connected by end frames 9 which together with the cross members 6 form a rigid rectangular frame. The bearing member 6ª are also provided with central hubs in which are secured pins 10 which depend therefrom and are received and fitted into the apertures in the hubs of bearing plates 5. The longitudinal members 8 are provided at spaced points somewhat adjacent their ends with level indicating devices 11 shown as being of tube type having a liquid and bubble therein. These devices are surrounded by graduated plates, as shown in Fig. 5. The inner sides of the members 8 are notched at intervals to form seats for removable transverse plate-like bars 12 which also are provided adjacent their central portions with level indicating devices 11.

A coupling member 17 is provided which is in the shape of a fork having flat perforated ends adapted to be received between the apertured portions of the forks formed on sleeves 18 secured to the front axle 3 of the front trucks. This coupling device will be coupled to the forks on the sleeves 18 by suitable vertically disposed pins and the same is provided at its front ends with a slot 17ª adapted to receive a coupling pin for connecting the same to the traction means. Members 18 are held from longitudinal movement on the axle by suitable collars 18ª secured to one of the same.

The front axle of the rear truck is provided with a sleeve 19 having a projecting fork and held in place by a suitable collar secured to said axle. A link 20 extends toward the rear axle and is formed with a head having a laterally projecting pin 21. A sleeve 23 is secured to the rear axle 3 of the truck and has a projecting lug apertured to receive the pin 22. A lock member 24 comprising a circular disc having a plurality of circumferentially arranged holes therein is rigidly secured to the rear axle. When it is desired to apply the lock, the link 20 will be swung so that the pin 22 can be disengaged from the lug of sleeve 23 and engage with one of the holes in the disc 24. The rear axle will thus be positively locked. The members 8 have secured to their undersides substantially midway of their length, brackets 30 substantially of U-shape having spaced ribs at their lower portions between which projects an eyebolt 31 having a threaded end projecting through a plate 32 disposed at the inner side of the bearing 30 and clamped thereto by a nut 33 disposed on said threaded end.

The eye bolt 31 fits around a sleeve or tube 34 extending through apertures in said spaced webs of bearing 30 and extending upwardly through an opening in the central plate or bar 12, said sleeve having an enlarged portion 34ª above said bar 12. A rod 35 extends through the tube 34 and has a head formed in its upper end below which projects a plate or flag-like member 36 movable in a slot in the inner side of the portion 34ª. The plate 36 has graduations 36ª formed thereon adjacent the rod 35. The rod 35 is bent outwardly substantially at a right angle at its lower end and carries a comparatively long sleeve 37 thereon held in place with a nut 38 threaded onto the end of the rod 35. As clearly shown in Fig. 4 there is one of the rods 35, and parts associated therewith, at each side of the frame.

The device above described can be readily transported to the desired position on the track by attachment of the member 17 and the coupling thereof to a hand-car or other movable traction means. The member 17 is only used for such transportation of the device. The device can be used to gauge and level old or newly laid track. In practice, the device will be twelve to twenty feet in length and will be made of strong and rigid construction and yet of such material that the weight thereof will be comparatively small. The device will be moved along at intervals and twelve to twenty feet of track will be gauged and leveled at each setting thereof. The members 13 will be the proper distance apart to accurately gauge the rails, these members being mounted at the longitudinal center of the truck, and being mounted on rod 4 which rotates with the trucks, will thus always be at the same angle of the truck so that the rails will be properly gauged on a curve. The members 13 can be moved laterally some distance by sliding movement of rod 4 but are always held rigidly spaced at the proper gauging distance by the rod 14. The rod 14 will also be moved with the trucks when in rotative movement by the links 16. The rails will be set to properly engage the members 13 and the track will thus be accurately positioned.

The members 37 will ride along on top of the rails and are made long so as to accommodate the lateral movement thereof due to the device being on a curved track. Any hump or short irregularity in the rails will be indicated by the members 37 being raised and raising rods 35. The plates 36 will thus be raised and the amounts thereof can be judged from the graduations 36ª. Normally, the center of the plates 36 vertically will be substantially at the top of the tube portions 34ª.

The level indicating devices on the members 8 can be easily and quickly read and the track adjusted until the same indicate that the track is level. The graduated plates furnished with the levelling devices can also be used to indicate the desired grade on which the track is to be laid. The level indicating devices on the transverse members will indicate when the tops of the rails are in the same plane or when the same are in a plane disposed at the desired inclination.

When moving on a grade, the lock mechanism described is applied to hold the device stationary. When moving on a level or substantially level piece of track, no such application is necessary. The frame comprising members 7, 8 and 9 can be readily removed from the trucks and quickly replaced thereon. The finished bearing surfaces on the members 5 and 6 give a very accurate support for this frame. When the device is stored or not in use, the members 12 with the level indicating devices 11 can be removed and safely disposed to prevent injury to said level indicating devices.

In practice, the top of the frame will be substantially three feet from the top of the ties so that the one directing operations on the track can readily read the indicating devices thereon without objectionable stooping. As stated, the device will be set in one position and the track brought to the desired position, as indicated by the levelling devices. The device will then be moved to the next position and a long section of track will thus be operated on at each setting. The device will be of such light construction that it can be easily moved by hand and yet will be properly rigid. With the use of such a device, a large amount of track may be laid or operated on in a short time and much less labor will be required than with the devices heretofore used. It will also be noted that no parts of the device project any substantial distance outside of the rails and there will thus be no interference with any filling or grading operations for the track.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A track gauging and leveling device having in combination, spaced trucks having rigid frames having bearings directly journaled on the axles of said trucks each frame having a central annular balancing plate at its top vertically rigid in relation to said axle, a frame comprising spaced side longitudinal members extending between and beyond said trucks and spaced transverse members connecting said longitudinal members and carrying balancing plates rigid therewith adapted to rest upon said first mentioned balancing plate, depending laterally swingable bars spaced in rigid relation having lower outer rail-engaging surfaces depending at each side of each truck and at the longitudinal center thereof, and supporting means for said bars carried on said truck and adapted to turn therewith.

2. The structure set forth in claim 1, said last mentioned means each comprising a rod movable transversely in said trucks.

3. A track gauging and levelling device comprising spaced trucks, transverse members firmly supported thereon and fixed against vertical movement, a frame firmly supported upon said members extending between and beyond the same and having longitudinal spaced side members, a track gauging device adjacent each end of said frame comprising bars depending respectively from said trucks having widened lower portions with convex surfaces at their outer sides adapted to engage the inside of the rails, the bars on each truck having rigid connecting means intermediate their ends holding them in fixed spaced relation, a member movably connected to the upper ends of the bars and slidable transversely on said truck and adapted to turn therewith.

4. A rail gauging and leveling device having in combination, a pair of spaced trucks, each having spaced wheel-equipped axles, a frame comprising spaced rigidly connected longitudinally extending side members firmly supported upon said axles to prevent movement in a vertical direction, spaced level indicating devices upon said side members and depending spaced rigidly connected rail engaging devices depending from said tracks at the longitudinal center thereof.

5. A track gauging and leveling device comprising longitudinally spaced trucks adapted to be supported on a track and having bearing plates firmly supported thereon, a rigid frame comprising spaced longitudinal members extending between and above said trucks and carrying bearing plates adjacent each end thereof supported on and swivelly connected to said bearing plates on said trucks, a member carried at the longitudinal center of each truck and movable transversely thereof and adapted to turn therewith, a track gauging device loosely hung on and depending from each end of said member.

6. A track level indicating device comprising a pair of spaced trucks having wheel carrying axles and transverse bolsters firmly supported upon said axles, circular bearing plates formed at the centers of said bolsters, a frame having spaced transverse members with similar bearing plates adapted to engage and be firmly supported by said first mentioned bearing plates, said first mentioned bearing plates having central recesses and said second mentioned bearing plates having central pins adapted to fit in and be received in said recesses, said frame comprising spaced longitudinal and transverse end members having level indicating devices thereon and spaced firmly connected track engaging members depending respectively at each side of each truck and at the longitudinal center thereof.

In testimony whereof I affix my signature.

JOSEPH PIERSAUL.